:

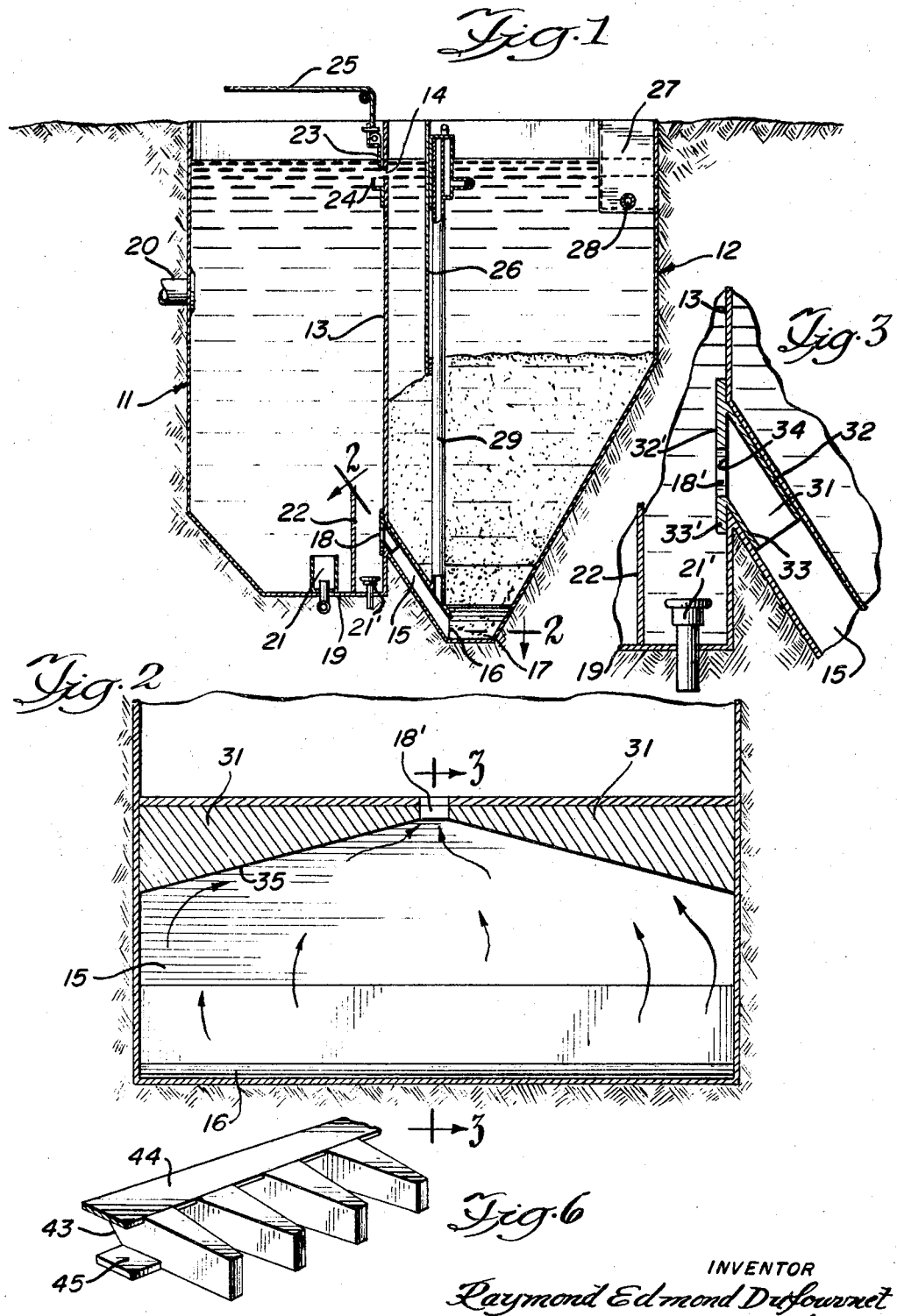

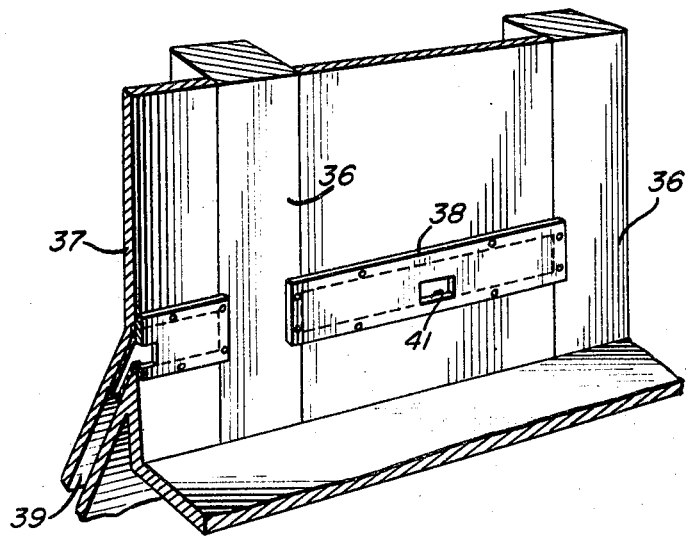
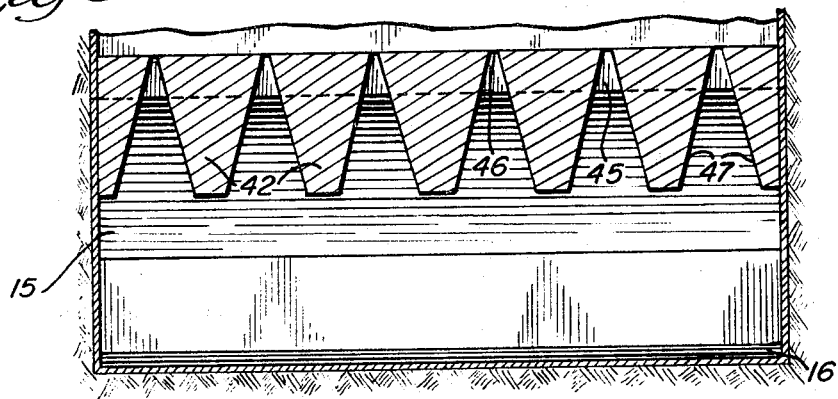
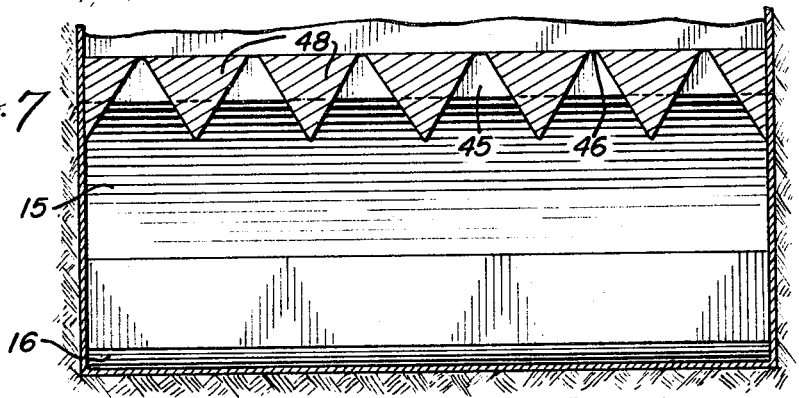

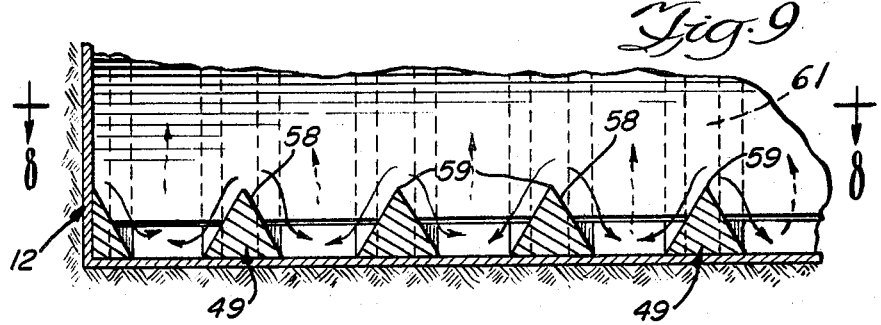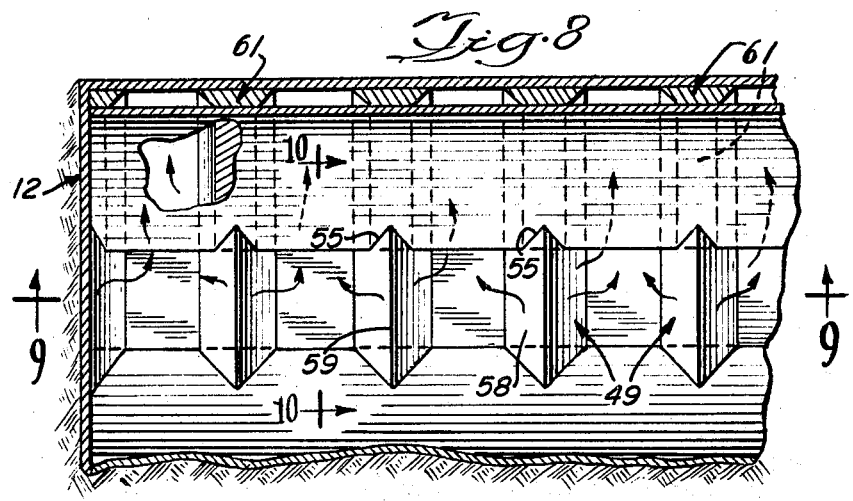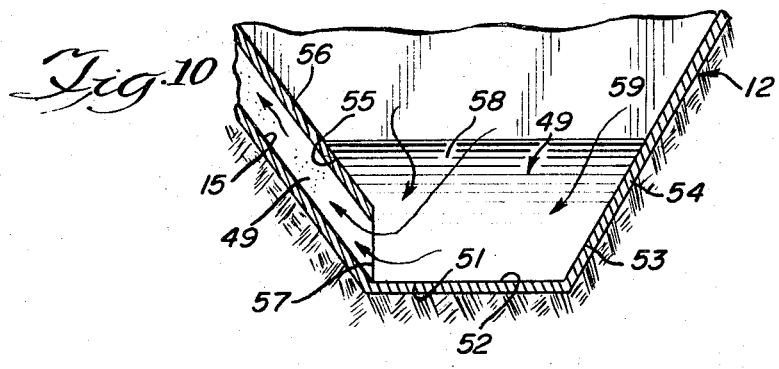

United States Patent Office 3,401,797
Patented Sept. 17, 1968

3,401,797
APPARATUS FOR TREATING AQUEOUS WASTE
Raymond Edmond Dufournet, 92–94 Rue Petit,
Paris 19, France
Filed June 9, 1966, Ser. No. 556,368
8 Claims. (Cl. 210—195)

ABSTRACT OF THE DISCLOSURE

This invention deals with apparatus for control of liquid flow in sewage treatment plants of the type having gasification and settling tanks communicating through direct liquid flow links, the first link being for transfer of mixed liquor from the upper portion of the gasification tank to the lower half of the settling chamber and the second link being an upwardly directed passage for transfer of settled sludge leading from the bottom portion of the settling tank to the gasification tank, and flow between the tanks is induced by the hydraulic head of liquid in the gasification tank, the apparatus for control of liquid flow consisting of diaphragm means insertable at the discharge end of the upwardly directed passage for transfer of settled sludge to the gasification tank whereby the cross-sectional area of the transfer port may be varied relative to the discharge opening of the upwardly directed passage so that smaller hydraulic head losses are dissipated in moving mixed liquor than are dissipated in moving sludge.

---

This invention relates to apparatus providing means for controlling flow of liquid in systems where liquid flows in response to hydraulic head and the flow is thru a plurality of restriction areas. More particularly, it relates to means for controlling the volume of sludge being recycled in a sewage treatment system where the aeration and settling tanks have direct communications opening at different elevational levels relative to the liquid surface.

In accordance with the present invention, apparatus is provided for treating aqueous waste comprising gasification and settling tanks having a communication link between the upper portion of the gasification tank and the settling tank and a second and direct communication link between the lower portion of the settling tank and the gasification tank so that there can be continuous uninterrupted flow of liquid thru the tanks and links in a series flow operation, wherein means is associated with the communication link connecting the lower portion of the settling tank with the gasification tank for varying the effective cross-sectional area of the outlet from the link and thereby influencing the liquid flow between the tanks.

In conventional activated sludge sewage treatment systems, mixed liquor after aeration is transferred to a settling tank where the sludge is concentrated. Generally, sludge is removed from the settling tank and a piping and pump system internal or external to the tanks returns the concentrate of sludge to the aerated tank to act as seed material in furthering the aerobic treatment.

Now it has been discovered that the liquid flow of recycled sludge in a simplified system wherein the bottom of the settling tank is linked by a passage communicating directly into the gasification tank, can be regulated by means providing control over the effective discharge cross-sectional area of the passage and thereby render the recycle flow substantially independent of the influent flow.

More in detail, in one embodiment of the invention, the sewage treatment system comprises a settling tank and a gasification tank having a common wall provided with transfer ports for flow of the mixed liquor from the gasification tank to the settling tank and an upwardly directed passage leading from the settling tank to the gasification tank for return of sludge. One or more transfer ports are provided in spaced relationship at the same level along the length of the common wall between the tanks, and the upwardly directed passage means may consist of a single conduit with a multiplicity of discharge openings or a plurality of conduits, each with discharge openings at a common level. For convenience the openings will hereinafter be referred to as if they are single openings, since each adjustment in any opening must be duplicated in the other similar openings to maintain the hydraulic balance of the system.

The transfer port generally is submerged below the liquid level of the tanks and a baffle may be provided in the settling tank adjacent the transfer port to direct the flow of mixed liquor toward the bottom of the settling tank. The preferred type of upwardly directed passage has an open entrance end near the lowermost portion of the settling tank and an open discharge end in the common wall at a level usually near the bottom of or in the lower portion of the gasification tank.

Air or oxygen introduced into the contents of the gasification tank to aerate it, expands the volume of the mixed liquor, thereby raising the liquid level and increasing the hydraulic head in the gasification tank. The differential in liquid levels between the two tanks provides the driving force, a portion of which operates to move liquid from the gasification tank through the submerged transfer port to the settling chamber, and the remainder to move sludge concentrate from the settling tank through the upwardly directed passage to the gasification tank.

In sewage treatment systems of the type with which the present invention is concerned, it is important to provide for an appreciable rate of sludge return to the gasification tank. Optimum results are attained when the volume of concentrated sludge recycled is from one to five times the volume of raw sewage flowing into the gasification tank. The flow of mixed liquor from the gasification tank to the settling tank, and of the sludge concentrate from the settling tank to the gasification tank is regulated by controlling the flow capacities of the flow passageways between the tanks. The cross-sectional area of the transfer port is adjusted to permit the flow of a predetermined amount of the mixed liquor therethrough. The apparatus is designed and initially adjusted to provide a hydraulic balance for the system. When the hydraulic head in the gasification tank remains substantially constant, i.e., when the volume of air or oxygen forced into the mixed liquor remains uniform, the hydraulic head due to difference between the liquid levels in the gasification and settling tanks provides a constant uniform driving force for the interflow of mixed liquor from the gasification tank into the settling tank, and of sludge from the settling tank into the gasification tank, and thus maintains a substantially uniform flow of concentrated sludge to the gasification tank.

Assuming other conditions are constant, any drop in the influent flow of raw sewage into the gasification tank causes increased flow of return sludge. Also any loss of driving force or hydraulic head such as that due to reduced injection of air, results in reduced flow of sludge in the recycle passage. As a consequence of reduction in flow for any cause, sludge can accumulate in the settling tank and can become so dense that it eventually plugs the upwardly directed passage and disrupts the entire system.

A decrease in the total driving force available for the interflow of mixed liquor and sludge may be compensated for by increasing the proportion of the available driving force applied to the movement of the sludge, relative to the proportion of said driving force applied to the movement of the mixed liquor.

Compensation for decrease in hydraulic head has heretofore been accomplished by changing the volume of mixed liquor flowing from the gasification tank to the settling tank, i.e., changing the size of the inlet to the communication link between the gasification tank and the settling tank. Such compensation is unsatisfactory because it may involve almost micrometer type adjustments since the change to be effected is proportional to the change in hydraulic head and this change itself may be only a fraction of an inch, or require frequent adjustment of the transfer ports.

To keep the system in balance, theoretical considerations teach that compensating flow controls could advantageously be introduced at the inlet to the sludge transfer passage. Such flow controls present problems of interference with the entrainment of sludge. Configuration of the settling tank bottoms have to be designed to direct the sludge to the inlet of the recycle passage. If the inlets are changed without change in tank bottom configuration blind areas may occur and when sludge is not removed in the normal operation of the system, it can become septic, and consequently disrupt the entire sewage treating system.

In accordance with the present invention, recycling of sludge is rendered substantially independent of the influent flow by adapting the discharge end of, for example, an upwardly directed sludge recycle passage, with diaphragm means, the total cross-sectional area of the openings of which can be correlated to the total cross-sectional area of the transfer ports. In this arrangement any sludge blocked from passage through the diaphragm opening settles back for reintrainment in the flowing stream of sludge moving to the diaphragm opening or openings and thus is not subject to accumulation in a stagnant zone.

In an arrangement of apparatus, the operating characteristics of which are to be subject to change, the submerged transfer port area is adjusted so that a larger proportion of the driving force due to hydraulic head, preferably 80%, is available for moving sludge concentrate from the settling tank through the upwardly directed passage and into the gasification tank, while a smaller proportion, preferably 20% of the available driving force is used for moving the mixed liquor from the gasification tank through the transfer port and into the settling tank. In other words, a smaller head loss is dissipated in moving the mixed liquor from the gasification tank to the settling tank than is dissipated in moving sludge from the settling tank to the gasification tank. It has been found that when the available energy is divided in the 80–20 ratio specified above, no adjustment is required to compensate for small changes in the influent flow of raw sewage. When the magnitude of the reduction of the hydraulic head necessitates adjustment of the relative sizes of the openings in the discharge end of the upwardly directed passage and the openings of the transfer port, such adjustments may be made either by changing the cross-sectional area of the openings in the passage without change in the area of the transfer port or by changes in the areas of the openings in both the passage and transfer port.

When designing apparatus it may be desirable to utilize a weir instead of a submerged transfer port for movement of mixed liquor to the settling chamber. In such a case the weir would be designed to transfer the maximum peak flow at not to exceed 20% of the available hydraulic head. The diaphragm at the outlet from the chimney would be designed to utilize the remaining 80% of the head.

If separate air supplies are provided, one for aeration and the other directly associated with the passage for creating an independent hydraulic head as far as the chimney is concerned, then the aeration system may be regulated to provide sufficient oxygen for treatment. The air requirement for recirculation of the sludge may then be adjusted to maintain constant rates of recirculation.

Suitable structure by means of which the above mentioned and other advantages are attained will be described in the following specification, taken in conjunction with the accompanying drawings showing a preferred illustrative embodiment of the invention, in which:

FIG. 1 is a cross-sectional view of an assembly comprising a gasification tank and a settling tank;

FIG. 2 is an enlarged cross-sectional view taken along the plane indicated by the line 2—2 of FIG. 1;

FIG. 3 is a cross-sectional view taken along the plane indicated by the line 3—3 of FIG. 2;

FIG. 4 is a fragmentary perspective view showing another embodiment of the plug means for the discharge opening through which sluge is moved for recycling;

FIG. 5 is an enlarged cross-sectional view showing another embodiment of the plug means;

FIG. 6 is a detail perspective view of the plug means shown in FIG. 5;

FIG. 7 is an enlarged cross-sectional view showing another embodiment of the plug means;

FIG. 8 is a fragmentary cross-sectional view, taken in the plane indicated by the line 8—8 of FIG. 9, and showing the final tank bottom arrangement;

FIG. 9 is a cross-sectional view, taken in the plane indicated by the line 9—9 in FIG. 8; and FIG. 10 is a cross-sectional view, taken in the plane indicated by the line 10—10 in FIG. 8.

Referring to FIGS. 1, 2 and 3 of the drawings, a gasification tank 11 and a settling tank 12 share a common wall 13 having a transfer port 14 below the liquid level of the tanks and an upwardly directed passage 15 extending from its entrance end 16 in the lowermost portion 17 of the settling tank and terminating at its upper end in a discharge opening 18 in the common wall 13, preferably a short distance above the bottom wall 19 of the gasification tank.

The gasification tank has an inlet 20 for raw sewage and gas dispersing apparatus 21 and 21' for introducing air or oxygen into the sewage in the gasification tank adjacent the bottom wall 19 of said tank, on opposite sides of a baffle 22 that extends from the bottom wall to a plane a short distance above the top of the discharge opening 18. The unit 21' is located adjacent the discharge opening 18 and is set out of the main flow stream of the aqueous suspension through the opening 18. The transfer port 14 may be in the form of an elongated slot, and a liquid flow regulating mechanism comprising an adjustable plate 23 slidable in a guide 24, is positioned adjacent the slot 14. A wire cable 25 is attached to the plate 23 for lifting or lowering the plate to increase or reduce the flow-through area of the transfer port.

A baffle 26 is mounted vertically in the settling tank adjacent the transfer port 14 and extends above the liquid level to direct the mixed liquor flowing through the transfer port downwardly toward the bottom of the settling tank so that the inflowing mixed liquor will not interfere with the settling action in the tank 12. The settling tank is provided with an effluent channel 27 and a drawoff pipe 28 through which clarified liquor is discharged. The settling tank is also provided with a pipe 29 and suitable mechanism associated therewith for wasting part of the sludge settling into the lower portion of the tank. The total volume of the clarified liquor discharged through the pipe 28 and the sludge wasted through the pipe 29 is equal to the volume of the influent raw sewage flowing into the gasification tank 11, and therefore the liquid levels of the tanks 11 and 12 are substantially constant.

The air or oxygen dispersed in the sewage in the gasification tank also expands the volume of the contents of said tank, and thereby creates a hydraulic head greater than that in the settling tank. The difference in pressure due to the greater head in the gasification tank provides a driving force for flowing mixed liquor from the gasification tank through the transfer port to the settling tank. The balance of the driving force or hydraulic head moves the sludge concentrate from the bottom of the settling tank through the passage 15 into the gasification tank to maintain the hydraulic balance of the sewage treating system.

The proportion of the hydraulic head applied to the flow of mixed liquor through the submerged transfer port, relative to the proportion of said hydraulic head applied to the movement of sludge through the discharge opening 18 varies inversely to the ratio of the cross-sectional areas of the transfer port and the discharge opening. In other words, if the cross-sectional area of the transfer port 14 is fixed, the proportion of the total available driving force that is applied to the flow of sludge through the discharge opening 18 may be increased by reducing the cross-sectional area of the discharge opening, or may be decreased by increasing the cross-sectional area of the discharge opening. The difference in the hydraulic heads of the two tanks can be determined by controlling the volume of the air or oxygen dispersed in the contents of the gasification tank.

The apparatus is adjusted at the time of its original installation so that the hydraulic head differential will remain substantially constant, and the volume of sludge that moves from the settling tank to the gasification tank will be from one to five times as great as the volume of raw sewage that flows into the gasification tank. The sewage treating system of the present invention contemplates maintenance of a substantially constant rate of return sludge. The sewage treating system, as hereinabove described, operates continuously in a very satisfactory manner as long as the air supply remains substantially constant.

When the quantity of air dispersed is reduced, it causes a loss in hydraulic head, and the total driving force is reduced. The amount of driving force available for moving the sludge through the passage 15 may not be sufficient for that purpose when the total driving force is reduced. Reapportionment of the available driving force to provide sufficient force for the proper movement of sludge through the passage 15 is not possible because of the relatively large cross-sectional area at the inlet end of the passage 15. It has been considered necessary to have the discharge opening extend across the entire width of the common wall 13 in order to avoid blind areas in which the sludge would accumulate.

If the inlet of passage 15 is restricted so that the cross-sectional area thereof is made small enough, relative to the area of the transfer port, to insure enough driving force to move sludge through the passage, some of the sludge would be restrained from movement through the passage by the surface of the restricting member facing the entrance end 16 of the passage. Sludge accumulating in such blind areas would remain unmoved because the driving force can move only the sludge having a clear flow course through the passage 15.

The accumulation of sludge in such blind areas will eventually become septic and disrupt the entire sewage treating process. Such accumulations of sludge may, of course, be eliminated by insertion of sloping surfaces to funnel the sludge to the passage inlet, or may be removed mechanically, but such expedients are not desirable because they add to the expense and may impair the efficiency of the sewage treating process.

In accordance with the embodiment of the present invention illustrated in FIGS. 1 to 3 of the drawings, a pair of plug members 31 positioned in the discharge opening partially block the discharge opening. Each plug member 31 has a thickness slightly less than the transverse distance across the discharge opening, and angle members 32 and 33 secured to the top and bottom surfaces, respectively, of both plug members increase the total thickness of the plugs to make it equal to the transverse dimension of the opening and hold the plug members in laterally spaced relationship to leave an opening 18' of any desired size. The upper angle member 32 has a leg 32' fitting against the wall 13 and extending downwardly to block the upper portion of the opening. The lower angle member 33 has a leg 33' fitting against the wall 13. The forward end of each plug is shaped, as indicated at 34, to make it flush with the wall 13. The rear surface 35 of each plug member is smooth, and extends outwardly at an angle sharp enough to permit sludge engaging said surfaces to be carried toward the opening 18', with the result that none of the sludge remains stationary within the passage 15. Although FIG. 2 shows only a single opening 18', it will be understood any number of such openings may be provided.

In the embodiment of the invention shown in FIG. 4, a plurality of vertical columns 36 divide a common wall 37 into sections of any desirable width, and two plug members 38 similar to the plug members 31 are fitted into the discharge end of an upwardly directed passage 39 between each pair of adjacent columns 36 to leave a plurality of discharge openings 41.

In the embodiment of FIGS. 5 and 6, the tank structure is the same as that of FIGS. 1 to 3. Wedge shaped plug members 42 are inserted in the passage 15 with their wide ends adjacent the discharge end of the passage. The wide ends of the plug members are shaped, as indicated at 43, to make them flush with the common wall 13. Flat strips 44 and 45 are secured to the wide ends of the plug members and hold them in spaced relationship so as to leave a plurality of relatively small discharge openings 46. The rear end portions of the plug members leave the entrance end 16 unrestricted, and the angular disposition of the side walls 47 of the plug members provides a smooth path for the sludge so that none of it can accumulate in the passage 15.

The structure of FIG. 7 is similar to that of FIGS. 5 and 6 except that the plug members 48 are shorter than the plug members 42 and leave most of the passage 15 unobstructed.

In the embodiment of FIGS. 8 to 10, the inlet end of the upwardly directed passage 15 is divided into a plurality of relatively small, spaced openings by blocks 49 positioned in spaced parallel relationship so as to segment the bottom of the settling tank. Each block 49 has a flat bottom 51 seating on the floor 52 of the tank. One end wall 53 of each block is shaped to fit against the sloping wall 54 of the tank 12. The opposite end wall of the block has a portion 55 shaped to fit against the upper surface of the upper wall 56 defining the passage 15. At the lower end of the wall 56 the end of the block 49 extends vertically to the floor 52 of the tank, as indicated at 57.

The side walls 58 of each block extend downwardly from an apex 59 at an angle of approximately 60° to insure that the sludge will move downwardly into the tank bottom in front of unobstructed passageways between adjacent blocks. A plug 61 of any suitable construction is positioned within the passage 15 in alignment with each of the blocks 49. The plugs 61 have a cross-sectional configuration to coincide with the cross-sectional configuration of the portion of the blocks defined by the end portion 57. The plugs may be of concrete or any suitable plastic material molded in place, or may be preformed and then inserted into the passage 15. Thus the areas of the pasage 15 that are shut off are blocked throughout the entire depth of the passage. The arrows in FIGS. 8 to 10 indicate the flow path of the sludge. Since the blocks 49 create a structure in the bottom of the tank 12 which is, in effect, a plurality of hoppers directing settling material to the spaced inlets to the recycle passage, there are no blind spots in which the sludge can accumulate.

Although I have described several preferred embodiments of the invention in considerable detail, it will be understood that the description thereof is intended to be illustrative rather than restrictive, as many details of structure may be modified or changed without departing from the spirit or scope of the invention. Accordingly, I do not desire to be limited to the specific structures described.

I claim:
1. An apparatus for treating aqueous waste comprising adjacent gasification and settling tanks, inlet means for introduction of sewage into said gasification tank, means in said gasification tank to create a difference in hydraulic head between the liquid levels of said tanks and thereby provide driving force for flowing mixed liquor from said gasification tank into said settling tank and for moving sludge from said settling tank into said gasification tank, a transfer port providing communication for the flow of mixed liquor from said gasification tank into said settling tank, means for removal of clarified liquid from said settling tank, upwardly directed conduit means extending from the lower portion of said settling tank and terminating at its upper end in a discharge port communicating with said gasification tank and adjacent said means to create hydraulic head difference to provide a flow course for the movement of sludge from said settling tank to said gasification tank, said conduit means defining an elongated passageway of a predetermined cross-sectional area, and plug means removably positioned within said passageway through said discharge port and blocking substantially the entire cross-sectional area of said passageway, said plug means including an opening therein of predetermined size and of a cross-sectional area substantially less than said predetermined cross-sectional area of said passageway, thereby regulating the proportion of said total available driving force used for the flow of said sludge.

2. The apparatus recited in claim 1 in which said plug means includes angle members at its top and bottom surfaces to make it fit snugly within the discharge port.

3. The apparatus recited in claim 1 in which said plug means comprises a plurality of plug members having sloping walls diverging from the discharge end of said conduit means toward the entrance end thereof.

4. The apparatus recited in claim 1 in which said plug means comprises a plurality of plug members of graduated width with the wider end of each plug member adjacent the discharge end of said conduit means, and means securing said plug members in spaced relationship whereby said plug members may be handled as a unit.

5. The apparatus recited in claim 1 in which said plug means comprises a plurality of plug members having vertically sloping walls to direct the downward movement of sludge into alignment with unobstructed portions of said conduit means.

6. The apparatus recited in claim 5 in which portions of said plug members extend across the bottom of the settling tank and said portions are of uniform cross-sectional area and are spaced laterally across said settling tank to divide said conduit means into a plurality of relatively narrow unobstructed passages.

7. The apparatus recited in claim 1 in which said gasification and said settling tank have a common wall, and said transfer port and said discharge port each extend through said common wall below the liquid level of the tanks.

8. The apparatus according to claim 1 in which the discharge port of said conduit means is directed into an area separated from the main portion of the gasification tank by a wall member, and an air diffuser member is located adjacent said discharge port and set out of the main flow stream of the sludge issuing through said discharge port.

References Cited
UNITED STATES PATENTS

| | | | |
|---|---|---|---|
| 2,678,916 | 5/1954 | Kalinske | 210—221 X |
| 3,101,321 | 8/1963 | Austin et al. | 210—195 X |

FOREIGN PATENTS

| | | |
|---|---|---|
| 686,592 | 5/1964 | Canada. |
| 1,263,336 | 3/1962 | France. |
| 465,209 | 9/1928 | Germany. |

REUBEN FRIEDMAN, *Primary Examiner.*

J. L. DE CESARE, *Assistant Examiner.*